United States Patent [19]

Flanigen

[11] 4,349,463

[45] Sep. 14, 1982

[54] ACETYLENE STORAGE VESSEL

[75] Inventor: Edith M. Flanigen, White Plains, N.Y.

[73] Assignee: Union Carbide Corporation, Danbury, Conn.

[21] Appl. No.: 226,084

[22] Filed: Jan. 19, 1981

[51] Int. Cl.³ .................... B01J 20/10; F17C 11/00
[52] U.S. Cl. ................................. 252/457; 206/0.7
[58] Field of Search ............... 252/457, 449; 106/120; 206/0.7

[56] References Cited

U.S. PATENT DOCUMENTS

| | | | |
|---|---|---|---|
| 2,504,314 | 4/1950 | Feick | 206/0.7 |
| 2,528,692 | 11/1950 | Heeren | 206/0.7 |
| 2,883,040 | 4/1959 | Pater et al. | 207/0.7 |
| 3,540,865 | 11/1970 | Pape | 252/449 X |
| 3,783,092 | 1/1974 | Majumdar | 161/170 |
| 3,794,505 | 2/1974 | Helser et al. | 106/119 |
| 3,859,106 | 1/1975 | Majumdar | 106/120 |
| 3,887,386 | 6/1975 | Majumdar | 106/99 |
| 3,901,720 | 8/1975 | Majumdar | 106/50 |
| 4,129,450 | 12/1978 | Flanigen et al. | 106/120 |
| 4,179,303 | 10/1979 | Shannon | 106/119 |

FOREIGN PATENT DOCUMENTS 675072  8/1963  Canada ......................... 252/455

OTHER PUBLICATIONS

Brochure–*AR Glass Fiber for Cementitious Materials*, Owens-Corning Fiberglas Corp., Toledo, Ohio (1975).

*Primary Examiner*—Carl F. Dees
*Attorney, Agent, or Firm*—E. Lieberstein

[57] ABSTRACT

An acetylene storage vessel having an asbestos free, hardened, porous calcium silicate filler material comprising at least 35 percent by weight crystalline phase reinforced by alkali resistant glass fiber and a method for the manufacture thereof.

18 Claims, 1 Drawing Figure

U.S. Patent
Sep. 14, 1982
4,349,463
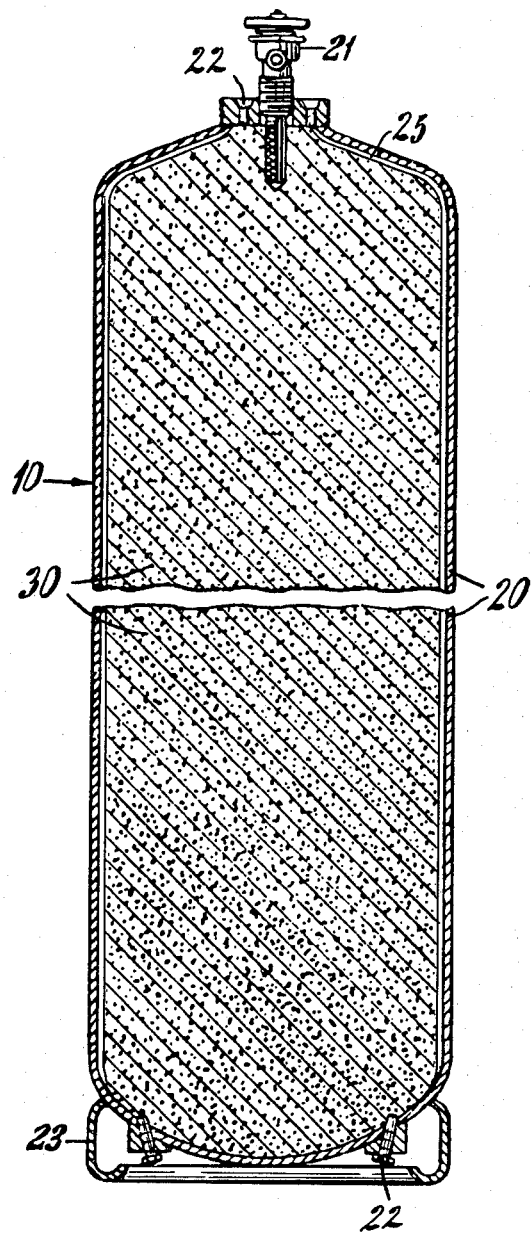

ACETYLENE STORAGE VESSEL

This invention relates to acetylene storage vessels. More particularly, this invention relates to acetylene storage vessels having an asbestos free calcium silicate filler material comprising at least 35 percent by weight crystalline phase reinforced with alkali resistant glass fiber and a method for manufacturing same.

BACKGROUND OF THE INVENTION

Acetylene gas is typically stored in the form of a dissolved acetylene gas solution, for example in acetone solvent, in a vessel containing a cured, hardened, porous calcium silicate filler mass. In the prior art practice, asbestos fibers have been commonly employed as a reinforcing agent for the hardened calcium silicate filler and as a settling resistant or suspending agent in slurries used to prepare the calcium silicate filler.

Typically, the porous calcium silicate filler mass is formed from a mixture of sand or silica and quicklime (calcium oxide) dispersed into water to form an aqueous slurry. The aqueous slurry composition is introduced into the vessel and autoclaved at high temperature and saturated steam pressure to form a hardened crystalline calcium silicate filler mass. This is followed by baking at a high temperature to drive the water from the hardened crystalline calcium silicate mass to obtain the desired porosity.

The functional purpose of the asbestos fibers is two-fold. Introduced into the aqueous slurry, the asbestos fiber functions as a settling resistant or suspending agent to retard settling or separation of the slaked lime and silica from the water in the aqueous slurry composition prior to hardening. Other thickening agents may also be added to the slurry in addition to the asbestos fibers if desired.

In the hardened calcium silicate filler mass, the asbestos fiber functions as reinforcing agent to enhance structural strength.

The two-fold functional purposes of the asbestos fibers in the calcium silicate mass and its preparation has special significance in acetylene gas storage vessel technology due to the coordinate requirements of safety and durability. That is, a dissolved acetylene gas must be safely stored and it must be safely stored for extended periods of time in environments where the storage vessel will be subjected to rough handling and hazards such as: dropping the cylinder or vessel; impact loads being imposed on the cylinder or vessel; the danger of fire; and the danger of flash back.

The special significance of the storage requirements for a dissolve acetylene gas is readily appreciated in view of the fact that acetylene gas is unstable—that is, it can decompose to its elements (carbon and hydrogen) with explosive violence if not properly stabilized.

To provide for the safe storage of acetylene gas, the gas is dissolved in a solvent such as acetone. The dissolved gas is received in a porous hardened calcium silicate filler mass disposed in and substantially filling the acetylene storage vessel. The filler, by capillary action, retains the acetylene acetone solution and distributes it uniformly through the filler mass to provide a safe storage and handling system. It is important that there by no large volumes within the cylinder which are not filled by the filler mass. Shell to filler clearances no greater than 0.05% of any cylinder shell dimension, but not greater than ⅛ inch have been established as satisfactory.

The calcium silicate filler mass is formed having uniformly distributed very fine pores. Pore sizes are typically about $0.05\mu$ to $25\mu$ ($\mu = 1 \times 10^{-6}$ m.) in size. To be functional as a storage medium for the dissolve acetylene gas solutions, the porosity of the calcium silicate mass is typically at least about 85 percent. That is, 85 percent of the volume of the calcium silicate mass comprises pores. Suitably, the porosity is about 90 percent or greater consistent with safety.

It is of great importance that the porosity of the calcium silicate mass is provided by these very fine pores. That is, the calcium silicate mass should be monolithic and should be substantially free of voids. Void spaces provide an available space for the formation of an unacceptable volume of acetylene gas with the attendant explosion risk.

Therefore, the agent used for suspending or preventing the settling or separation of the silica and slaked lime in the aqueous slurry until the slurry is hardened must function so that when the autoclaved hardened or cured calcium siliate mass is baked to drive off the water only the very fine pores will be uniformly distributed throughout the monolithic mass which is substantially free of voids.

In addition to having a high uniformly distributed porosity, the calcium silicate mass must maintain its structural integrity under possible adverse and hazardous conditions. The asbestos fiber assists in the maintenance of the structural integrity of the filler mass by providing reinforcement.

Structual failure or destruction of the calcium silicate mass (e.g., break-up or cracking) can produce dangerous void spaces or cause clogging of the fluid path provided by the functioning of fuse plugs or other safety pressure relief devices responsive to an overpressure situation.

Other required characteristics of the calcium silicate filler is that it functions as a heat sink to minimize the dangers of an external fire or flash back.

The calcium silicate filler should not exhibit excessive shrinkage during autoclaving and baking of the calcium silicate filled vessel during the manufacturing process. Excessive shrinkage will also result in unacceptable voids. Furthermore, the calcium silicate filler must exhibit satisfactory gas discharge performance so that the acetylene storage vessel will fulfill its intended function as a source of acetylene gas for industrial uses.

The uniform distribution of pores in the calcium silicate filler material enhances the gas discharge characteristics of the acetylene storage vessel. Likewise, the uniform distribution of pores enhances the charging of the acetylene storage vessel with a dissolved acetylene gas solution. A further function of the asbestos fibers reinforcement of the porous calcium silicate filler is that the presence of the asbestos fibers also enhance the gas discharge characteristics of an acetylene storage vessel. An acetylene storage vessel having a porous calcium silicate filler without asbestos fiber reinforcement exhibits poor gas discharge characteristics compared with an acetylene storage vessel having a porous calcium silicate filler with asbestos fiber reinforcement.

The hardened porous calcium silicate filler mass used as an acetylene vessel filler should be at least 35 percent by weight crystalline phase to provide sufficient structural strength and resistance to shrinkage at elevated temperatures.

Asbestos fibers functioning as a reinforcing and settling resistant agent have achieved the foregoing requirements in a satisfactory manner.

Nonetheless, the art has been seeking a fiber substitute for asbestos fibers as a reinforcing and settling resistant or suspending agent for acetylene storage vessel porous calcium silicate fillers due to well known recent concerns that asbestos fibers may pose health and pollution problems.

OBJECT OF THE INVENTION

It is therefore an object of the present invention to provide an acetylene storage vessel having an asbestos free, fiber reinforced, hardened, porous, monolithic calcium silicate filler.

It is a further object of the present invention to provide a method for the manufacture of an acetylene storage vessel having an asbestos free, fiber reinforced, hardened, porous, monolithic calcium silicate filler.

It is yet a further object of the present invention to provide a method for the manufacture of an acetylene storage vessel having an asbestos free, fiber reinforced, hardened, porous monolithic calcium silicate filler wherein the calcium silicate filler is formed from an asbestos free aqueous slurry.

It is another object of the present invention to provide an acetylene storage vessel having an asbestos free, fiber reinforced hardened, porous monolithic calcium silicate filler comprising at least 35 percent by weight crystalline phase and a method for the manufacture thereof wherein the calcium silicate filler has the uniformly distributed very fine porosity, strength, shrinkage, heat sink characteristics and gas discharge characteristics suitable for receiving a dissolved acetylene gas solution.

These and other objects will be apparent from the following description and claims in conjunction with the drawing.

In accordance with the present invention, alkali resistant glass fibers used as a reinforcing and settling resistant or suspending agent will provide a hardened, porous calcium silicate mass comprising at least 35 percent by weight crystalline phase having characteristics of uniformly distributed, very fine pores, substantial absence of voids, strength, heat resistance, shrinkage and gas discharge performance suitable for receiving a dissolved acetylene gas solution and for use as an acelylene storage vessel filler and will provide acetylene storage vessels meeting the acceptability standards of the Compressed Gas Association, Inc.

SUMMARY OF THE INVENTION

The present invention may be generally characterized as an acetylene storage vessel comprising:
a metal shell;
a hardened asbestos free monolithic calcium silicate filler material comprising at least 35 percent by weight crystalline phase and having a porosity of at least about 85 percent disposed in and substantially filling said metal shell for receiving an acetylene gas solution with said porosity being provided by substantially uniformly distributed very fine pores having a size of about 0.05 to 25 microns and with said calcium silicate filler being substantially absent of voids;
said calcium silicate filler material having a fibrous reinforcing material constituting at least 0.5 percent by weight said calcium silicate being disposed substantially uniformly throughout said calcium silicate; and wherein said fibrous reinforcing material is an alkali resistant glass fiber.

A second aspect of the present invention may be generally characterized as a method for forming an acetylene storage vessel having a hardened, porous, monolithic filler material for receiving a dissolved acetylene gas solution comprising:

(a) providing an asbestos free aqueous slurry comprising water, CaO and SiO$_2$ wherein the weight ratio of CaO to SiO$_2$ is about 0.6 to 1.0;

(b) dispersing an asbestos free settling resistant and reinforcing fibrous material in said slurry said fibrous material being an alkali resistant glass fiber wherein said fibrous material is added in quantity sufficient to constitute at least 0.5 percent of the solids weight of the fiber containing slurry composition with said slurry composition having a water volume percent of at least about 85 percent;

(c) disposing said slurry composition into said acetylene storage vessel so as to substantially fill said vessel;

(d) autoclaving said slurry in said vessel at saturated steam pressure and elevated temperature to form said calcium silicate product comprising at least 35 percent by weight crystalline phase with said fibers dispersed substantially uniformly throughout said calcium silicate product and wherein said calcium silicate product substantially fills said acetylene storage vessel;

(e) baking said vessel containing said calcium silicate product until said product has a porosity of at least about 85 percent said porosity being provided by uniformly distributed very fine pores having a size of about 0.05 to 25 microns and being substantially absent of voids thereby providing said acetylene storage vessel with said calcium silicate filler in monolithic form for receiving said dissolve acetylene gas solution.

BRIEF DESCRIPTION OF THE DRAWING

The single FIGURE of the drawing is a simplified schematic in cross-section of an acetylene storage vessel having an asbestos free, hardened, porous calcium silicate filler reinforced with alkali resistant glass fibers in accordance with the present invention.

DESCRIPTION OF THE PREFERRED EMBODIMENT

In order to afford a complete understanding of the present invention and an appreciation of its advantages, a description of the preferred embodiments is presented below.

In reference to the single FIGURE of the drawing, acetylene storage vessel 10 comprises a metal shell 20 typically having a cylindrical shape forming an enclosed volume. An acetylene storage vessel is also typically provided with a valve 21, fuse plugs 22, and a foot ring 23. A hardened porous calcium silicate monolithic filler 30 is disposed in and substantially fills the enclosed volume of shell 20 for receiving a dissolved acetylene gas solution.

It is known in the art, see e.g., U.S. Pat. No. 2,883,040 to Pater and Houser, that a small clearance space 25 is desirable, although not required, between the upper end of cylinder shell 20 and the filler mass 30 which clearance is no greater than 0.05 percent of any cylinder shell dimension but not greater than ⅛ inch. Such a clearance space assists in the charging of the cylinder with a dissolved acetylene gas solution and the release of acetylene gas from the dissolved acetylene gas solution disposed in the porous calcium silicate filler. However, excessive clearance must be avoided due to safety considerations.

In accordance with the present invention, the hardened porous calcium silicate filler material is at least 35 percent by weight crystalline phase, asbestos free and is reinforced by alkali resistant glass fiber disposed substantially uniformly throughout the calcium silicate mass. The porosity of the calcium silicate filler is suitably at least about 85 percent and advantageously about 88 percent to 92 percent. Porosities of up to about 96 percent could be obtained if desired. The porosity of the calcium silicate mass is provided by substantially uniformly distributed very fine pores having a size of about 0.05 to 25 microns ($1 \times 10^{-6}$ meters) throughout the hardened calcium silicate mass.

The calcium silicate mass must be at least 35 percent by weight crystalline phase, with at least 50 percent by weight crystalline phase being desirable, because of considerations of structural strength and shrinkage resistance of the calcium silicate at high temperatures.

Tobermorite crystalline phase calcium silicate is suitable for a calcium silicate mass functioning as an acetylene storage vessel filler. Xonotlite crystalline phase calcium silicate is particularly advantageous for an acetylene storage vessel calcium silicate filler since xonotlite exhibits greater structural strength and better shrinkage resistance at elevated temperatures than tobermorite. An acetylene storage vessel having a calcium silicate filler comprising at least 50 percent by weight xonotlite crystalline phase is most advantageous from considerations of strength and shrinkage resistance at high temperatures. A calcium silicate filler comprising about 55 percent to 70 percent xonotlite crystalline phase is well suited for acetylene storage vessels.

The porosity ranges of the hardened calcium silicate filler are derived from considerations of carrying capacity of the cylinder and structural strength. High porosities are desirable from a practical commercial viewpoint since for a given sized vessel an increase of porosity of the filler will increase the amount of dissolved acetylene gas solution, and hence increase the amount of acetylene gas which can be stored. However, increased porosities tend to decrease the structural strength of the filler and impair its function as a heat sink. Porosities of about 88 percent to 92 percent have been found to be most advantageous in commercial applications to meet the dual requirements of strength and carrying capacity.

The very fine pores providing the porosity of the hardened calcium silicate filler mass are required to be substantially uniformly distributed throughout the hardened calcium silicate in order to achieve maximum carrying capacity for a given volume of calcium silicate mass and in order to provide satisfactory gas discharge performance.

It is important for the safety reasons hereinbefore discussed that the monolithic calcium silicate filler mass be substantially absent of voids.

Alkali resistant glass fibers in the form of chopped fibers are used as reinforcement for the hardened calcium silicate mass primarily to increase structural strength in tension or flexure. In accordance with the present invention, the alkali resistant glass fibers will constitute at least about 0.5 percent, suitably about 1 percent to 30 percent and most suitably about 2 percent to 7 percent the weight of the hardened calcium silicate filler mass. The alkali resistant glass fibers also function as a settling resistant or suspending agent for the aqueous slurry from which the hardened calcium silicate filler mass is manufacture as hereinafter described.

Alkali resistant glass fibers are described, for example, in U.S. Pat. Nos. 3,783,092 and 3,887,386 to Majumdar and may be obtained from CemFIL Corporation, Nashville, Tenn. and Owens-Corning Fiberglas Corporation, Toledo, Ohio.

The chopped alkali resistant glass fibers used in accordance with the present invention may suitably have a length of about $\frac{1}{8}$ inch to 3 inches. Commercially available fibers have filament diameters on the order of magnitude of about 5 to 20 microns. The foregoing dimensions are given by way of example. However, it is contemplated that fibers with different dimensions may be readily employed.

Alkali resistant glass fibers containing $ZrO_2$ have been found to be advantageously employed in accordance with the present invention. However, other alkali resistant glass fibers having the characteristics of not substantially degrading in saturated aqueous $Ca(OH)_2$ solutions at process times and temperatures are contemplated for use herein. Examples are alkali resistant glass fibers containing $TiO_2$, $ZnO$, $SnO_2$ or $CdO$.

In the method of manufacture of an acetylene storage vessel with an alkali resistant glass fiber calcium silicate filler in accordance with the present invention, an aqueous slurry composition is made up comprising quicklime ($CaO$) and sand or silica ($SiO_2$). The CaO to $SiO_2$ weight ratio is desirably in the range of about 0.6 to 1.0 and preferably in the range of about 0.8 to 1.0, based upon stoichiometric considerations in order to produce the maximum amount of calcium silicate from the CaO and $SiO_2$ reactant materials.

Slaked lime [$Ca(OH)_2$] may be used instead of quicklime (CaO). In this instance, an amount of $Ca(OH)_2$ equivalent to CaO would be used to attain the desired CaO to $SiO_2$ weight ratios. It will be apparent to one skilled in the art that if quicklime (CaO) is used, a small amount of water will be utilized to slake the quicklime.

The water volume percent is desirably about 85 percent to 96 percent and preferably about 88 percent to 92 percent.

In the aqueous slurry composition, the alkali resistant glass fiber should constitute a least 0.5 percent and suitably about 1 percent to 30 percent of the solids weight of the slurry, and most suitably about 2 to 7 percent of the solids weight of the slurry. The lower range represents the minimum quantity of alkali resistant glass fiber required in order to satisfactorily retard separation of the water and solids components of the slurry prior to hardening and to provide adequate reinforcement of the resultant cured calcium silicate reaction product. The upper ranges are based on economic and handling considerations.

The slurry may be prepared, for example, by slaking the quicklime in the water and adding the silica and the alkali resistant glass fiber in chopped form having lengths, by way of example, of about $\frac{1}{8}$ to 3 inches, to the slaked lime. In accordance with the method of the present invention, it is not necessary to predisperse the alkali resistant glass fibers in water prior to the addition of the fibers to the slurry. The chopped alkali resistant glass fibers may be dispersed directly to the slurry.

The slurry is mixed, for example by stirring, to insure the alkali resistant glass fibers are substantially uniformly distributed throughout the slurry. When the slurry becomes quiescent, it exhibits thixotropic characteristics.

The slurry is introduced into the acetylene storage vessel so as to substantially fill the vessel with a homogeneous slurry mixture. That is, the vessel should be filled with a homogenous slurry mixture so that no air pockets or voids remain. The filled vessel should not stand for a long enough time prior to further processing to incur the possibility of any substantial settling of the solid ingredients of the slurry mixture. Standing time is desirably less than one hour.

For autoclaving, the vessel is provided with a suitable autoclaving fitting such as a pressure relief valve and filter in place of valve 21 or an expansion chamber fitted tightly to the filling opening at the top of the vessel in place of valve 21. Other types of autoclaving fittings may be used, e.g., such as described in U.S. Pat. No. 2,883,040 to Pater and Houser.

The acetylene storage vessel filled with the slurry composition and with the autoclaving fitting installed is placed in an oven and is autoclaved at saturated steam pressure and elevated temperature. The autoclaving temperature is desirably at least about 250° F. with a temperature range of about 330° F. to 450° F. being suitable and about 360° F. to 400° F. being most suitable. The autoclaving is accordingly carried out at corresponding saturated steam pressure or higher. Time of autoclaving is typically about 24 hours to 60 hours and is dependent on the size of the vessel.

After autoclaving, the acetylene storage vessel is allowed to cool and the autoclaving fitting removed.

The autoclaving is followed by baking whereby water is driven from the hardened calcium silicate mass, for example, via the filling opening, in order to obtain the desired porosity.

Baking should take place at a sufficient temperature and for a sufficient time to insure driving off all the water from the hardened calcium silicate contained in the acetylene storage vessel.

After baking, the acetylene storage vessel is cooled and valve 21 may be installed. The acetylene storage vessel may now be charged with solvent and acetylene gas, i.e., a dissolved acetylene solution.

Accordingly, the water volume percent of the slurry composition is chosen so as to achieve the desired porosity of the hardened calcium silicate filler. As is known in the art, the water volume percent of the slurry composition approximately will equal the porosity of the hardened calcium silicate mass. After hardening of the slurry by autoclaving, substantially all the water is driven from the hardened mass formed by the reaction of the slaked lime and silica by baking. Therefore, the fiber added to the highly dilute slurry, i.e., the alkali resistant glass fibers in accordance with the present invention, must retard separation of the water and solids sufficiently to provide the product calcium silicate filler in the acetylene storage vessel with substantially uniformly distributed very fine pores. The alkali resistant glass fibers in accordance with the present invention performs this function in a satisfactory manner and achieves the desired result.

A calcium silicate mass having a porosity of 85 percent to 96 percent corresponds to a density of about 0.015 lbs/in$^3$ (410 kg/m$^3$) to 0.0040 lbs/in$^3$ (110 kg/m$^3$). Porosities of 88 percent to 92 percent correspond to a density of about 0.012 lbs/in$^3$ (330 kg/m$^3$) to 0.0080 lbs/in$^3$ (220 kg/m$^3$).

A water volume percent of 85 percent to 96 percent corresponds to a water-to-solids weight ratio of about 1.9:1 to 8.1:1. A water volume percent of 88 percent to 92 percent corresponds to a water-to-solids weight ratio of about 2.5:1 to 3.9:1.

Use of thickening agents in the slurry composition in addition to the alkali resistant glass fibers are not required. In some instances the use of additional thickening agents may be desired by one skilled in the art. In such instances a thickening agent such as polyethylene oxide, a soluble salt of phosphate and a soluble salt of calcium or a soluble salt of phosphate and a neutralizing acid as described and claimed by U.S. Pat. No. 4,129,450 to Flanigen, Lok, and Mumbach, the disclosure of which is incorporated herein by reference, would be suitable.

Thickening agents containing aluminum compounds should not be used if xonotlite crystalline phase is desired since small amounts of aluminum can poison the reaction for the formation of xonotlite crystalline phase. Accordingly, free aluminum ions should be substantially absent from the slurry. It is also believed that magnesium ions will poison the reaction for the formation of xonotlite crystalline phase. Portland cement is not suitable for the manufacture of acetylene vessel fillers having xonotlite or tobermorite crystalline phase because Portland cement will not form significant amounts of xonotlite or tobermorite crystalline phase.

Gelation of the slurry prior to autoclaving is not required in accordance with the present invention. A gelation step, however, may be used if desired by one skilled in the art. It is recognized that by stating that a gelation step is not required prior to autoclaving, this does not exclude that the reacting slurry composition during the autoclaving process may go through a stage that may be described as a gel.

Organic fibers such as cellulose fibers including wood fibers, wood pulp, cotton linters, etc. are not desirable in the slurry since they will be destroyed by pyrolysis if the acetylene storage vessel is exposed to high temperature caused by, e.g., fire or a flash back.

To more fully illustrate the present invention, the following examples are set forth:

EXAMPLE I

For purposes of illustration and comparison, a conventional calcium silicate filler was prepared using asbestos fiber in a laboratory environment. An aqueous slurry was prepared from the materials listed in Table IA. In Table IA, percent by weight means percent of dry solids weight.

TABLE IA

| Quicklime | percent by weight | 40.0 |
|---|---|---|
| Silica (quartz flour) | percent by weight | 50.0 |
| Asbestos | percent by weight | 10.0 |
| Water | lbs. per lb. lime | 9.0 |
| Lime to silica | weight ratio | 0.80 |
| Water-to-solids | volume ratio | 10.3 |
| Water-to-solids | volume % | 91.2 |

In making up the aqueous slurry, the lime was slaked in 60 percent to 65 percent of the total water and the asbestos fiber was dispersed in the remainder of the water. A predispersal step is necessary with asbestos fibers in order to induce separation of the agglomerative asbestos to provide a fine uniform dispersion of the asbestos in the aqueous slurry. The silica and the predispersed asbestos fiber are then added to the slaked lime followed by further stirring of the whole mix. The settling characteristics were satisfactory. The finished slurry composition was introduced into a reactor and sealed. Autoclaving was carried out at a temperature of 400° F. for sixteen hours under saturated vapor pressure. After autoclaving, the reactor was cooled down to ambient temperature and opened. Baking was then commenced, first at 230° F. for 2 hours followed by further baking at 590° F. for 118 hours. The crystalline composition from X-ray diffraction of the resultant porous calcium silicate mass in weight percent are listed in Table IB. The physical properties of the resultant porous calcium silicate mass are listed in Table IC.

TABLE IB

| Xonotlite | 60% |
|---|---|
| Tobermorite | 6% |
| Amorphous | 16% |
| Asbestos | 18% |
| Quartz | 0 |

TABLE IC

| Shrinkage | 0.10% |
|---|---|
| Bulk Density | 0.26 g/cm$^3$ |
| True Density | 2.74 g/cm$^3$ |
| Porosity | 90.5% |
| Strength, Compressive | 386 psi |
| Strength, Flexural | 364 psi |
| Pore Size at Maximum Pore Distribution | 0.53μ |
| Specific Surface Area | 60.7 m$^2$/g |

EXAMPLE II

In Example II, a porous calcium silicate filler was made in a laboratory environment using alkali resistant glass fibers in accordance with the present invention. The alkali resistant glass fibers used contained about 17.8 percent by weight zirconia and are sold under the trade name "Cem-FIL" by Pilkington Brothers Limited, St. Helens, Merseyside, England. An aqueous slurry was prepared from the materials listed in Table IIA. In Table IIA percent by weight means percent of dry solids weight.

TABLE IIA

| Quicklime | percent by weight | 43.6 |
|---|---|---|
| Silica (quartz flour) | percent by weight | 54.5 |
| Alkali Resistant Glass Fiber | percent by weight | 2.0 |
| Water | lbs. per lb. of lime | 7.9 |
| Lime to silica | weight ratio | 0.80 |
| Water-to-solids | volume ratio | 10.0 |
| Water | volume % | 91.1 |

The preparation procedures were substantially the same as in Example I except that the alkali resistant glass fiber was not predispersed in water prior to being added to the slurry mix. The alkali resistant glass fibers were added directly to the slaked lime in chopped form with the fibers having a typical length of about 1 to 2 inches. No other fibers or thickening agents were added to the slurry composition. Water separation characteristics of the slurry were observed to be satisfactory. The crystalline composition from X-ray diffraction of the resultant porous calcium silicate mass in weight percent is listed in Table IIB. The physical properties of the resultant porous calcium silicate mass are listed in Table IIC.

TABLE IIB

| Xonotlite | 89% |
|---|---|
| Tobermorite | 0 |
| Amorphous | 10% |
| Alkalai Resistant Glass Fiber | 2% |
| Quartz | 0 |

TABLE IIC

| Shrinkage | 0.095% |
|---|---|
| Bulk Density | 0.28 g/cm$^3$ |
| True Density | 2.7 g/cm$^3$ |
| Porosity | 89.6% |
| Strength, Compressive | >477 psi |
| Strength, Flexural | 466 psi |
| Pore Size at Maximum Pore Distribution | 0.57μ |
| Specific Surface Area | 82.5 m$^2$/g |

Comparison of the test results for alkali resistant glass fibers in Example II with asbestos fibers in Example I and inspection of the slurry and calcium silicate product of Example II indicates that alkali resistant glass fibers may be satisfactory for use in the manufacture of acetylene storage vessel caclium silicate fillers. For example, the alkali resistant glass fibers of Example II provided a calcium silicate mass of comparable compressive and flexural strength with the asbestos fibers of Example I. Shrinkage and pore size in Examples I and II were almost identical. The alkali resistant glass fibers of Example II provided a slurry where water separation was satisfactory. That is, the alkali resistant glass fiber performed its function as a suspending or settling resistant agent in a satisfactory manner in the laboratory. Furthermore, inspection of the resultant calcium silicate mass produced in laboratory Example II using alkali resistant glass fibers indicated that the very fine pores were substantially uniformly distributed throughout the calcium silicate.

Example II was conducted in a laboratory environment. Satisfactory results from a fiber in a laboratory test do not necessarily indicate that a fiber will perform satisfactorily as a reinforcing agent and settling resistant agent in an actual acetylene storage vessel. That is, it does not indicate that an acetylene storage vessel will pass the Compressed Gas Association, Inc. *Schedule of Data and Tests To Determine The Acceptability Of Porous Filling Material For Use In Acetylene Cylinders In The United States and Canada* (Docket 755, Approved February 1962). Furthermore, it does not indicate that the filler will exhibit satisfactory gas discharge characteristics.

Tests were therefore performed on actual acetylene storage vessels manufactured under factory conditions.

EXAMPLE III

A group of acetylene storage cylinders corresponding to cylinder model WS manufactured by Union Carbide Corporation, New York, N.Y., were made having a monolithic calcium silicate filler prepared from an aqueous slurry having the materials listed in Table IIIA. In Table IIIA, percent by weight means percent of dry solids weight.

TABLE IIIA

| Quicklime | percent by weight | 47 |
|---|---|---|
| Silica | percent by weight | 48 |

TABLE IIIA-continued

| | | |
|---|---|---|
| (quartz flour) | | |
| Alkali Resistant Glass Fiber | percent by weight | 5 |
| Water | lbs. per lb. of lime | 7.42 |
| Lime to silica | weight ratio | 0.98 |
| Water-to-solids | volume ratio | 10.3 |
| Water | volume % | 91.2 |

In making up the aqueous slurry, the lime was slaked in the total amount of water. The silica and the alkali resistant glass fiber in chopped form were added to the slaked lime. The chopped fiber had a nominal length of about ¼ inches. The alkali resistant glass fiber was Product No. AR-140X1 manufactured by Owens-Corning Fiberglas Corporation of Toledo, Ohio. The slurry was mixed by stirring to insure uniform dispersion of the fiber throughout the slurry. Settling resistant characteristics were satisfactory. No additional thickening agents or fibers other than the alkali resistant glass fibers were used. The slurry was introduced into and substantially filled the cylinders. The cylinders were autoclaved at saturated steam pressure and baked to provide the porous, hardened calcium silicate mass.

The physical characteristics of the calcium silicate filler of the acetylene storage cylinders reinforced with the alkali resistant glass fibers are listed in Table IIIB.

TABLE IIIB

| | |
|---|---|
| Shrinkage | 0.05% |
| Porosity | 89.5% |
| Strength, compressive | 353 psi |
| Strength, flexural | 118 psi |
| Strength, tensile | 48 psi |
| Xonotlite | 65% |
| Tobermorite | 3% |
| Amorphous | 27% |
| Alkali Resistant Glass Fiber | 5% |

The cylinders so manufactured with alkali resistant glass fibers have successfully passed the Compressed Gas Association bonfire test, flashback test, and mechanical strength tests. The tests are described in detail in the hereinbefore cited document but may be briefly described as follows.

BONFIRE TEST

One fully charged cylinder is connected to a remotely located pressure gage. With the valve open, the cylinder is placed horizontally on a suitable support so that a fire can be built under and around the sides but not the ends of the cylinders, thus shielding the safety relief device (fuse plugs) from direct impingement of the flame. The fire is of such proportions that the pressure within the cylinder rises at least 25 psi before any safety device functions. One or more of the safety devices must function within ten minutes. To meet the requirements of this test, the cylinder must not fail violently. If conditions of wind or other test variables cause the cylinder to open up in a small split due to local intense heating, retest is permitted. After the cylinder has been allowed to cool for a period of 24 hours, it is sectioned longitudinally for examination. Any decomposition which may occur must be confined to the area adjacent to the cylinder shell, but must not extend generally through the mass.

FLASHBACK TEST

One fully charged cylinder has a recording pressure gage connected to the bottom of the cylinder (a fuse plug opening may be used). A flashback block test assembly (or equivalent) [illustrated, e.g., in the CGA test document] is connected to the valve outlet. All air is purged from the flaskback block assembly and the cylinder valve allowed to remain open. A spark plug-hot wire ignitor in the flashback block assembly is then operated to cause an explosion of the acetylene in the flashback block. The explosion must not cause failure of the cylinder proper nor sufficient decomposition of the content of the cylinder to create any appreciable increase in pressure within a period of 48 hours. As an alternative to the use of the recording pressure gage, it is acceptable to measure the cylinder pressure before the test and after the 48 hour period by means of an indicating pressure gage applied to the cylinder valve.

MECHANICAL TESTS

The cylinder with acetylene at atmospheric pressure is placed in a vertical position on an apparatus so arranged as to subject the cylinder to successive drops from a height of not less than three inches so as to strike the end of the cylinder on a steel or cast iron surface solidly supported by a concrete foundation or equivalent. The cylinder is subjected to this drop five thousand times consecutively. The cylinder is then sectioned longitudinally and the filling mass carefully examined. To meet the requirements of this test, no appreciable settling or breaking up of the filling mass should be noted after this treatment, nor should there be any voids in the filler material.

In addition to passing the foregoing described tests, an acetylene storage vessel having a calcium silicate filler reinforced with alkali resistant glass fibers exhibits satisfactory gas discharge characteristics.

EXAMPLE IV

Acetylene storage cylinders were manufactured with the procedure of Example III with rockwool, wollastonite and zirconia fibers. In laboratory tests, each of these fibers demonstrated characteristics in the slurry and the product calcium silicate to indicate that they may be satisfactory in the manufacture of acetylene vessel fillers. The aqueous slurries were prepared from the materials listed in Table IVA. The rockwool fibers used were manufactured by L. C. Cassidy Co. of Indianapolis, Ind. The wollastonite fibers used were Product No. F-1 manufactured by Interpace Corp. of Parsippany, N.J. The zirconia fibers used were fibers of substantially pure zirconia, i.e., at least about 95 percent zirconia ($ZrO_2$) and were Product No. ZYBF-2 manufactured by Zirconia Products, Inc. of Florida, N.Y.

TABLE IVA

| Fiber | Rockwool | Wollastonite | Zirconia |
|---|---|---|---|
| Quicklime (wt. % dry) | 43.7 | 43.7 | 44.6 |
| Silica (wt. % dry) | 45.7 | 45.7 | 45.4 |
| Fiber (wt. % dry) | 10.6 | 10.6 | 10.0 |
| Water (lbs./lb. lime) | 8.2 | 8.2 | 7.6 |
| Lime to Silica | 0.95 | 0.95 | 0.98 |
| Water to Solids | 10.4 | 10.4 | 10.6 |
| Water volume % | 91.3 | 91.3 | 91.4 |

The physical characteristics of the calcium silicate filler of the acetylene storage cylinders reinforced with rockwool and wollastonite fibers are listed in Table IVB.

TABLE IVB

|  | Rockwool | Wollastonite |
|---|---|---|
| Shrinkage | 0% | 0.05% |
| Bulk density | 17.6 pcf | 16.8 pcf |
| True density | 168.7 pcf | 170 pcf |
| Porosity | 89.6% | 90.1% |
| Strength, compressive | 304 psi | 390 psi |
| Strength, tensile | 50 psi | 69 psi |

Acetylene cylinders manufactured with rockwool and wollastonite fibers would not permit free release of acetylene through the fusible plugs of the acetylene cylinder in the bonfire test. Accordingly, they were found unsatisfactory for use in manufacture of acetylene storage vessels and other tests were not conducted.

Zirconia fibers resulted in bulging of the shell of the acetylene cylinder during autoclaving. Accordingly, they were found unsatisfactory for use in acetylene storage vessels. Therefore, physical characteristics wre not measured and other tests were not conducted.

Example III thus demonstrates that alkali resistant glass fibers are satisfactory for use as a reinforcing agent and a settling resistant agent for acetylene storage vessels having porous calcium silicate fillers.

Example IV demonstrates that just because a fiber appears satisfactory from the viewpoint of laboratory tests, this does not mean that it will be a satisfactory reinforcing agent and settling resistant agent for acetylene storage vessels having porous calcium silicate fillers.

Although preferred embodiments of the present invention have been described in detail, it is contemplated that modifications may be made and that some features may be employed without others, all within the spirit and scope of the invention.

What is claimed is:

1. An acetylene storage vessel comprising:
a metal shell;
a hardened asbestos free monolithic calcium silicate filler comprising at least 35 percent by weight crystalline phase and having a porosity of at least about 85 percent disposed in and substantially filling said metal shell for receiving an acetylene gas solution with said porosity being provided by substantially uniformly distributed very fine pores having a size of about 0.05 to 25 microns and with said calcium silicate filler being substantially absent of voids;
said calcium silicate filler material having a fibrous reinforcing material constituting at least 0.5 percent by weight said calcium silicate filler being disposed substantially uniformly throughout said calcium silicate; and wherein
said fibrous reinforcing material is an alkali resistant glass fiber.

2. An acetylene storage vessel as recited in claim 1 wherein said calcium silicate filler material has a porosity of about 88 percent to 92 percent.

3. An acetylene storage vessel as recited in claim 1 wherein said alkali resistant glass fiber constitutes about 1 percent to 30 percent by weight said calcium silicate filler material.

4. An acetylene storage vessel as recited in claim 1, 2 or 3 wherein said alkali resistant glass fiber contains $ZrO_2$.

5. An acetylene storage vessel as recited in claim 4 wherein said alkali resistant glass fiber contains about 10 to 20 weight percent $ZrO_2$.

6. An acetylene storage vessel as recited in claim 1, 2 or 3 wherein said calcium silicate filler comprises at least 35 percent by weight tobermorite crystalline phase.

7. An acetylene storage vessel as recited in claim 1, 2 or 3 wherein said calcium silicate filler comprises at least 50 percent by weight tobermorite crystalline phase.

8. An acetylene storage vessel as recited in claim 1, 2 or 3 wherein said calcium silicate filler comprises at least 35 percent by weight xonotlite crystalline phase.

9. An acetylene storage vessel as recited in claim 1, 2 or 3 wherein said calcium silicate filler comprises at least 50 percent by weight xonotlite crystalline phase.

10. An acetylene storage vessel as recited in claim 1, 2 or 3 wherein said calcium silicate filler comprises about 55 percent to 70 percent by weight xonotlite crystalline phase.

11. An acetylene storage vessel as recited in claim 1 having a dissolved acetylene gas solution disposed within said calcium silicate filler material.

12. A method for forming an acetylene storage vessel having a hardened porous monolithic filler material for receiving a dissolved acetylene gas solution comprising:
(a) providing an asbestos free aqueous slurry comprising water, CaO and $SiO_2$ wherein the weight ratio of CaO to $SiO_2$ is 0.6 to 1.0;
(b) dispersing an asbestos free settling resistant and reinforcing fibrous material in said slurry said fibrous material being an alkali resistant glass fiber wherein said fiberous material is added in quantity sufficient to constitute at least 0.5 percent of the solids weight of the fiber containing slurry composition with said slurry composition having a water volume percent of at least about 85 percent;
(c) disposing said asbestos free slurry composition in said acetylene storage vessel so as to substantially fill said vessel;
(d) autoclaving said slurry in said acetylene storage vessel at saturated steam pressure and elevated temperature to form said calcium silicate product comprising at least 35 percent by weight crystalline phase with said fibers dispersed substantially uniformly throughout said calcium silicate product and wherein said calcium silicate product substantially fills said acetylene storage vessel;
(e) baking said acetylene storage vessel containing said calcium silicate product until said product has a porosity of at least about 85 percent said porosity being provided by uniformly distributed very fine pores having a size of about 0.05 to 25 microns and being substantially absent voids thereby providing said acetylene storage vessel with said filler product in monolithic form for receiving said dissolved acetylene gas solution.

13. A method as recited in claim 12 which further comprises the steps of:
(f) cooling said baked vessel containing said porous calcium silicate product;
(g) disposing a dissolved acetylene gas solution within said porous calcium silicate.

14. A method as recited in claim 12 wherein said slurry composition has a water volume percent of about 88 percent to 92 percent and said baked calcium silicate product has a porosity of about 88 percent to 92 percent.

15. A method as recited in claim 12 or 14 wherein said alkali resistant glass fiber constitutes about 1 percent to 30 percent the solids weight of said fiber containing slurry composition.

16. A method as recited in claim 12 wherein said alkali resistant glass fiber contains $ZrO_2$.

17. A method as recited in claim 16 wherein said alkali resistant glass fiber contains about 10 to 20 weight percent $ZrO_2$.

18. A method as recited in claim 12 or 14 wherein said weight ratio of CaO to $SiO_2$ is about 0.8 to 1.0.

* * * * *